United States Patent [19]

Kato

[11] 3,898,572

[45] Aug. 5, 1975

[54] CODE REGENERATING NETWORK FOR PULSE CODE COMMUNICATION SYSTEMS

[75] Inventor: Kotaro Kato, Tokyo, Japan

[73] Assignee: Nippon Electric Company, Limited, Tokyo, Japan

[22] Filed: Dec. 5, 1973

[21] Appl. No.: 422,124

[30] Foreign Application Priority Data

Dec. 7, 1972 Japan .............................. 47-123096

[52] U.S. Cl. ................ 328/164; 307/268; 328/103; 328/163

[51] Int. Cl. .......................... H03k 5/01; H04b 1/10

[58] Field of Search ........................... 307/268, 269; 328/162–164, 103, 104, 105, 152, 153, 61; 179/15 AD, 15 AG; 178/70 R, 71 B

[56] References Cited

UNITED STATES PATENTS

| | | | |
|---|---|---|---|
| 3,050,713 | 8/1962 | Harmon | 328/106 X |
| 3,054,958 | 9/1962 | Bensky et al. | 328/106 X |
| 3,156,896 | 11/1964 | Martin et al. | 328/61 X |
| 3,184,663 | 5/1965 | Mergler | 328/61 X |

*Primary Examiner*—John Zazworsky

*Attorney, Agent, or Firm*—Sughrue, Rothwell, Mion, Zinn and Macpeak

[57] ABSTRACT

A pulse regeneration network adapted to regenerate pulse codes having transmission delay distortions. The network includes a plurality of pulse regeneration circuits which operate at a certain maximum clock rate. They are combined to provide regeneration of pulse coded trains at higher clock rates than the clock rates of the pulse regeneration circuits.

6 Claims, 4 Drawing Figures

CODE REGENERATING NETWORK FOR PULSE CODE COMMUNICATION SYSTEMS

BACKGROUND OF THE INVENTION

This invention relates to a code regenerating network for a pulse code communication use for regenerating from a received signal a rectangular wave free from waveform distortion and, more particularly, to a network that can find extensive use in regeneration of high-speed codes.

In the pulse code transmission, a rectangular waveform signal transmitted from the transmitter end undergoes the so-called delay distortion and the like due to various interferences introduced in the transmission path. This is the reason why a code regenerating network is usually employed at the receiving end in order to restore from the received signal a rectangular waveform signal free from the delay distortion and other waveform distortion.

With conventional code regenerating systems, it has been commom practice to regenerate the code as a logic 1 or 0 depending on whether or not the instantaneous level at a readout point of the received signal has exceeded a certain threshold value. For this reason, the clock rate of a readout pulse to be applied to a code regenerating circuit is made equal to the clock rate of the signal applied to the input of the code regenerating circuit. Consequently, an increase in the clock rate of the input signal applied to the code regenerating circuit immediately results in the increase in readout speed of the code regenerating circuit.

The sensitivity characteristics of the code regenerating circuit will become deteriorated with an increase in the readout speed, resulting in unfavorable effects such as an increase in jitter at the readout time point. For this reason, the upper limit of the clock rate of the input signal has, in the past, been forced equal to that of the operational clock rate of the code regenerating circuit per se. Thus, the regeneration of input signals with speeds faster than the operational maximum clock rate of the code regenerating circuit was generally impossible.

Accordingly, an object of the present invention is to provide a code regenerating network suitable for high-speed code transmission with a clock rate equal to N times (N being a positive integer equal to or greater than 2) the operational maximum clock rate of the code regenerating circuit, by eliminating the aforementioned defects of the conventional code regenerating circuits.

SUMMARY OF THE INVENTION

The code regenerating network according to this invention is composed essentially of: a branching circuit for branching a high-speed received code signal into N code trains of the same high rate (N being a positive integer equal to or greater than 2); a readout pulse generating circuit for receiving clock pulses with a speed coincident with the clock rate of the high-speed code signal and for generating N readout pulse trains, each being spaced at N-bit regular intervals and shifted by one-bit from the immediately preceding train; N code regenerating circuits having the N outputs from the branching circuit applied as their signal inputs, respectively, and the N outputs from the readout pulse generating circuit as their readout pulses, respectively; N "AND" gates for detecting coincidence between the outputs of the N code regenerating circuits and the corresponding readout pulses; an "OR" gate for taking the logical sum of the outputs of said N "AND" gates and for making a regenerated signal output equivalent to said high-speed code train.

The present invention as mentioned above can be used as a code regenerating network for a receiver in various communication systems such as digitally encoded TV signal transmission, PCM communications handling multiplexed voice-frequency channels, high-speed data transmission, or ultra high-speed PCM communications handling code trains in which these signals are multiplexed, thereby contributing to an improvement in the code transmission quality.

For further objects and advantages of this invention, a detailed description will be given hereunder in conjunction with the accompanying drawings.

DETAILED DESCRIPTION OF THE PREFERRED EMBODIMENTS

Figure 1:
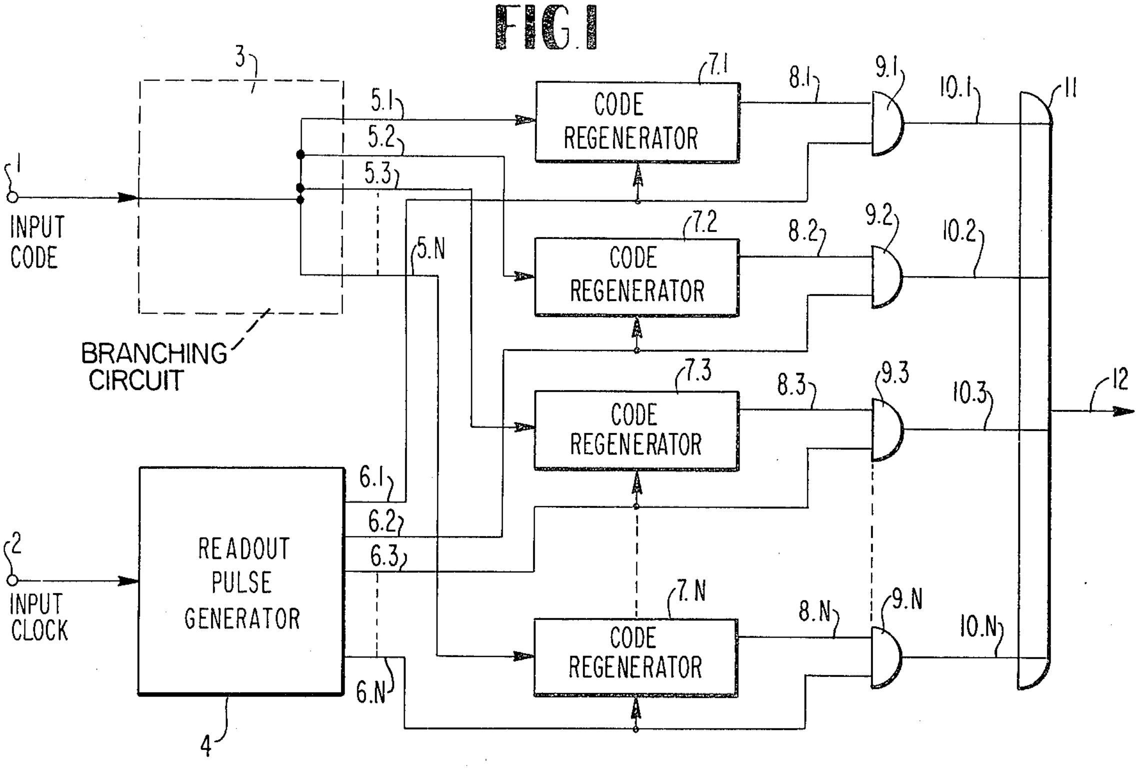
FIG. 1 illustrates in block diagram a pulse code regeneration network according to an embodiment of this invention.

Referring now to FIG. 1 which illustrates a code regenerating network embodying this invention, the reference numeral 1 denotes an input terminal for receiving a coded signal whose waveform has been distorted in the transmission path; 2, an input terminal for the clock pulses having a repetition rate exactly equal to the clock rate of the signal arriving at the terminal 1; 3, a branching circuit for branching the input signal trains incoming through the terminal 1 into exactly equal N signal trains; and 4, a readout pulse generating circuit for generating the pulse trains 6.1, 6.2, 6.3, . . . 6. N, by the use of the incoming clock pulses.

Figure 2:
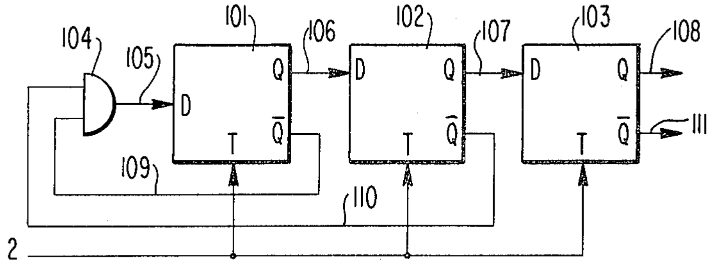
FIG. 2 illustrates in block diagram an actual readout pulse generating circuit contained in the circuit arrangement of this invention.
Figure 3:
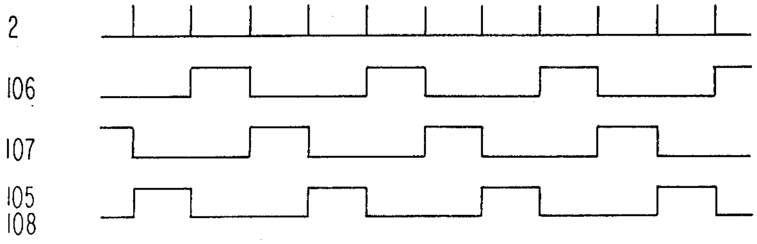
FIG. 3 is a timing chart illustrating the operational waveforms of the readout pulse generating circuit shown in FIG. 2.

A description of an actual example of the readout pulse generating circuit 4 will now be given referring to FIGS. 2 and 3. Although this example is described for a particular case where N=3, it will be obvious to those skilled in the art that a similar circuit can be realized for any value of N, which is a positive integer equal to or greater than 2. In FIG. 2, reference numerals 101, 102 and 103 denote circuits generally known as the shift register stages. By these shift register stages, respective input signals 105, 106 and 107 are conveyed to respective outputs as signals 106, 107, and 108, bit-by-bit, at the rate of the clock pulses applied at the common terminal 2. Further, the shift register stages 101, 102 and 103 provide the output signals 109, 110 and 111 respectively which are opposite in polarity to the signals 106, 107 and 108. The reference numeral 104 denotes an AND gate which develops a logic 1 at the output 105 only when both signals 109 and 110 applied to the inputs thereof are a logic 1, and a logic 0 in any of the other cases. Assuming now that the initial condition is taken when both outputs 109 and 110 have become a logic 1, the output 105 in this case is a logic 1 and all of the outputs 106 and 107 are logic 0. One bit afterwards, the output 106 of the shift register 101 becomes a logic 1, whereas the outputs 107 and 108 will be logic 0. Therefore, the output 109 will be a logic 0 and both outputs 110 and 111 will become a logic 1. As the result, the output 105 of gate 104 will be turned to a logic 0. Thus, one bit further afterwards, the outputs 106 and 107 are turned respectively to a logic 0 and a logic 1, whereas the output 108 remain as a logic 0. By the similar operation, one bit still further afterwards, both outputs 106 and 107 become logic 0 and the output 108 become a logic 1. In this case, both outputs 109 and 110, which are respectively in opposite polarity to the outputs 106 and 107, will be logic 1 respectively. That is, the initial condition can be restored. Thenceforth, the similar operation cycle as mentioned previously repeats itself to obtain the desired waveforms from the outputs 106, 107 and 108 as shown in the timing diagram of FIG. 3 with the same reference numerals. While the readout pulse generating circuit shown in FIG. 2 is known, it is apparent that the equivalent function can be achieved by other known circuits. In general, the readout pulse generating operates functionally as a recirculating shift register having one logic 1 which is circulated in response to input shift pulses corresponding to the clock pulses.

Returning to FIG. 1, the reference numerals 7.1 through 7.N denote code regenerating circuits represented by the well-known edge-trigger type flip-flop circuits for reading out the input signal trains 5.1 through 5.N respectively by use of the readout pulses 6.1 through 6.N and for generating the rectangular code trains 8.1 through 8.N. Each code regenerating circuit may be composed of a flip-flop circuit known as the master-slave type or of any other well known circuit having the equivalent function. The reference numerals 9.1 through 9.N denote N "AND" gates for taking respectively the logical products "AND" between the inputs 8.1 through 8.N and 6.1 through 6.N and for developing their outputs 10.1 through 10.N. The reference numeral 11 denotes an OR gate which develops a logic 1 at the output 12 only when either one of the outputs 10.1 through 10.N of these AND gates is a logic 1.

Figure 4:
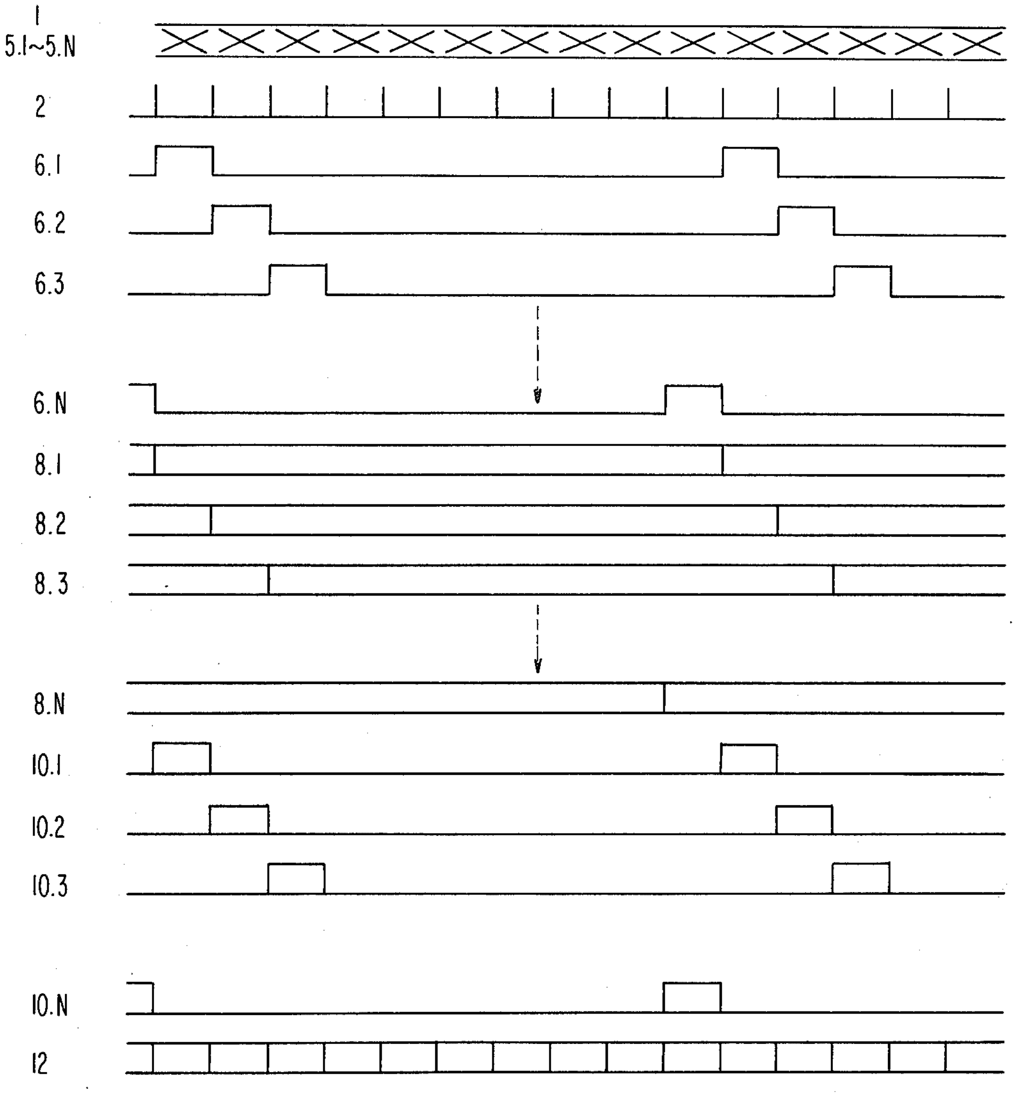
FIG. 4 is a timing chart illustrating the operational waveforms of the code regenerating network shown in FIG. 1.

Now the operation of this code regenerating network will be analyzed referring to the timing chart of FIG. 4 in which various waveforms are shown with the same reference numbers as indicated in FIG. 1. An encoded signal incoming through the input terminal 1 has a high speed and hence, all signals 5.1 through 5.N forming the N separate pulse trains branched from the branching circuit 3 have also a high speed. In its simplest configuration the branching circuit may be a simple wired connection having one input wire (plus ground) and N output wires (plus ground). On the other hand, the clock signal incoming through the terminal 2 is synchronized beforehand with the received input code signal and is in perfect coincidence with the clock rate of the input signal. It is well-known that a circuit for generating clock signals synchronized with the clock component of the received input code signal can be composed of a phase locked circuit, for example. The readout pulse generating circuit 4 generates, as seen in FIG. 4, the readout pulses 6.1 through 6.N in N trains, each being spaced at N-bit regular intervals and shifted by one bit from the immediately preceding train. Therefore, the repetition rate on each output line 6.1-6.N becomes equal to one-Nth ($1/N$) of the input clock pulse rate. Since the clock pulse rate is designated R, the pulse rate on each output line may be designated R/N. The code regenerating circuits 7.1 through 7.N respectively read out the input high-speed code trains 5.1 through 5.N by the use of these readout pulses 6.1 through 6.N. For instance, the first bit of the high-speed code train 5.1 is read out at the leading edge of the readout pulse 6.1 by the code regenerating circuit 7.1 and the read out content is held therein till the subsequent readout time that occurs N bits afterwards. In other words, the readout frequency occurs once every N bits of the input signal and only at this time point can the code regenerating circuit read out the input data and all data at time points at which no readout pulses exist are entirely disregarded thereby. In such a way, the outputs 8.1 through 8.N of the code regenerating 7.1 through 7.N become the low-speed pulse trains consisting of N trains, shifted in phase by one bit equivalence of the high-speed code train in succession as seen in the timing chart. Each of the high-speed code trains 5.1 through 5.N is read out only once for N bits, but the information read out by the code regenerating circuits 7.1 through 7N is extracted from each of the signal trains 5.1 through 5.N with one-bit shift in succession. As a result, all bits of the input signal arriving at the input terminal 1 are repeatedly read out for every Nth bit in the sequence of the code regenerating circuits 7.1, 7.2, 7.2, 7.3 . . . . 7.N and delivered to the outputs 8.1 through 8.N. Then, each logical product "AND" between the outputs 8.1 through 8.N of the code regenerating circuits 7.1 through 7.N and the readout pulses 6.1 through 6.N is taken by the AND gates 9.1 through 9.N and further, the logical sum "OR" of their outputs 10.1 through 10.N is taken by the OR gate 11 to perform the multiplexing. As a consequence, the waveform of the high-speed input signal arriving at the input terminal 1 is shaped into rectangular pulse train as illustrated at 12 in the timing chart of FIG. 4 and the code is regenerated as a signal with the same high speed as the input signal.

Although the present embodiment of this invention has realized the high-speed code regenerating network as mentioned previously, only the N circuits 7.1 through 7.N have actually participated in code regeneration in this circuit structure. Since each of the circuits operates at a speed equal to one-Nth of the clock rate of the input signal, a degradation in regenerative sensitivity or an increase in jitter incidental to the high-speed operation can be reduced to a minimum and hence, the optimum code regenerating system can be realized.

What is claimed is:

1. A code regenerating network for use in a receiver for a pulse code communication system, comprising:

a branching circuit for branching an incoming high-speed code signal train into N code trains of the same high speed (N being a positive integer equal to or greater than 2);

a readout pulse generating circuit for receiving clock pulses with a speed coincident with the clock rate R of said high-speed code signal train and for generating N readout pulse trains, each of said pulse trains having a clock rate R/N and having a phase which differs by one clock pulse from the immediately preceding train;

N code regeneration circuits supplied respectively with said N outputs from said branching circuit as their signal inputs and said N outputs from said readout pulse generating circuits as their readout pulses;

N AND gates for detecting respectively coincidence between the outputs of said N code regenerating circuits and said readout pulses corresponding thereto; and an OR gate for taking the logical sum of the outputs of said N AND gates and for making a regenerated signal output equivalent to said high-speed code signal train.

2. A pulse code regenerating network for providing, in response to an input coded pulse train and input clock pulses at the clock rate of said input coded pulse train, an output coded pulse train having the same code and the same clock rate as said input coded pulse train, comprising:

a. a plurality of code regenerating circuit means, each for providing an output logic signal dependent upon the logic level of a signal applied at a signal input thereof in coincidence with a clock signal applied to a trigger input thereof, b. means for applying said input coded pulse train to the respective signal inputs of said plurality of code regenerating circuit means, c. means responsive to said clock pulses for effectively applying said clock pulses in sequence to the said trigger inputs of said plurality of code regenerating circuit means, respectively, and d. multiplexing means responsive to said plurality of outputs from said plurality of code regeneration circuit means and to said sequentially applied clock pulses for providing at an output terminal thereof said logic output signals from said plurality of code regeneration circuit means in the same sequence as said applied clock pulses.

3. A pulse code regenerating network as claimed in claim 2 wherein said means for applying said clock pulses comprises:

a shift register having a plurality of serially connected stages;

means responsive to each said input clock pulse for shifting the state of each said stage to the state of each succeeding stage; and means connecting the said plurality of stages respectively to the plurality of trigger terminals of said code regeneration circuit means.

4. A pulse code regenerating network as claimed in claim 2 wherein said means for applying said input code signal to the said input signal terminals of said code regeneration means comprises, a branching circuit means having an input, a plurality of output terminals and means for connecting a signal applied at said input terminal to all said output terminals, and connection means connecting said plurality of branching circuit output means to said input terminals of said plurality of code regeneration means respectively.

5. A pulse code regenerating network as claimed in claim 3 wherein said multiplexing means comprises a plurality of logic AND gates, each having one input connected to the output terminal of a respective one of said code regeneration circuit means and the other input terminal connected to the said stage of said shift register which is also connected to the trigger terminal of said respective code regeneration circuit means, and a logic OR gate means having the outputs of all said AND gates connected as inputs thereto.

6. A pulse code regenerating network as claimed in claim 5 wherein said means for applying said input code signal to the said input signal terminals of said code regeneration means comprises, a branching circuit means having an input, a plurality of output terminals and means for connecting a signal applied at said input terminal to all said output terminals, and connection means connecting said plurality of branching circuit output means to said input terminals of said plurality of code regeneration means respectively.

* * * * *